(12) United States Patent
Kalistru

(10) Patent No.: US 11,522,680 B2
(45) Date of Patent: Dec. 6, 2022

(54) METHOD AND APPARATUS FOR COMPUTING HASH FUNCTION

(71) Applicant: Joint Stock Company "InfoTeCS", Moscow (RU)

(72) Inventor: Ilia Ivanovich Kalistru, Voronezh (RU)

(73) Assignee: Joint Stock Company "InfoTeCS"

( * ) Notice: Subject to any disclaimer, the term of this patent is extended or adjusted under 35 U.S.C. 154(b) by 247 days.

(21) Appl. No.: 16/954,061

(22) PCT Filed: Oct. 23, 2018

(86) PCT No.: PCT/RU2018/050130
§ 371 (c)(1),
(2) Date: Jun. 15, 2020

(87) PCT Pub. No.: WO2019/117758
PCT Pub. Date: Jun. 20, 2019

(65) Prior Publication Data
US 2021/0167944 A1 Jun. 3, 2021

(30) Foreign Application Priority Data
Dec. 14, 2017 (RU) .......................... RU2017143805

(51) Int. Cl.
*H04L 9/06* (2006.01)
*H04L 9/32* (2006.01)

(52) U.S. Cl.
CPC .......... *H04L 9/0643* (2013.01); *H04L 9/0637* (2013.01); *H04L 9/3236* (2013.01); *H04L 2209/125* (2013.01)

(58) Field of Classification Search
CPC ... H04L 9/0643; H04L 9/0637; H04L 9/3236; H04L 2209/125; H04L 9/3242; G06F 5/10; G06F 7/724; G06F 17/10
See application file for complete search history.

(56) References Cited

U.S. PATENT DOCUMENTS 7,085,988 B1* 8/2006 Weng .................... H04L 9/0643
708/492
7,827,384 B2* 11/2010 Zhang .................. H04L 9/0637
711/216

(Continued)

FOREIGN PATENT DOCUMENTS

RU 2598781 C1 9/2016

OTHER PUBLICATIONS

Abdellatif, Karim M. et al., "Efficient Parallel-Pipelined GHASH for Message Authentication", 2012 IEEE, 4 pages. (Year: 2012).*

(Continued)

*Primary Examiner* — Michael Pyzocha
(74) *Attorney, Agent, or Firm* — Mintz, Levin, Cohn, Ferris, Glovsky and Popeo, P.C.

(57) ABSTRACT

The group of inventions relates to computing techniques and can be used for computing a hash function. The technical effect relates to increased speed of computations and improved capability of selecting a configuration of an apparatus. The apparatus comprises: a preliminary preparation unit having M inputs with a size of k bits, where M>1; M pipelined computation units running in parallel, each comprising: a memory module, a feedback disable module, an adder, a pipeline multiplier having L stages, a feedback unit, and an accumulation unit; and a combining unit.

8 Claims, 2 Drawing Sheets

(56) References Cited

U.S. PATENT DOCUMENTS

| | | | |
|---|---|---|---|
| 7,970,130 B2 | 6/2011 | Yen | |
| 9,519,807 B1* | 12/2016 | Langhammer | G06F 21/76 |
| 2007/0081668 A1 | 4/2007 | McGrew et al. | |
| 2009/0080646 A1* | 3/2009 | Yen | H04L 9/3236 708/492 |
| 2010/0115017 A1 | 5/2010 | Yen | |
| 2018/0034628 A1* | 2/2018 | Trichina | H04L 9/0643 |
| 2019/0052455 A1* | 2/2019 | Little | G06F 7/724 |
| 2020/0026883 A1* | 1/2020 | de Almeida | H04L 9/002 |

OTHER PUBLICATIONS

International Preliminary Report on Patentability received for PCT Patent Application No. PCT/RU2018/050130, dated Jun. 25, 2020, 20 pages (13 pages of English Translation and 7 pages of Original Document).

International Search Report and Written Opinion received for PCT Patent Application No. PCT/RU2018/050130, dated Mar. 14, 2019, 20 pages (12 pages of English Translation and 8 pages of Original Document).

* cited by examiner

METHOD AND APPARATUS FOR COMPUTING HASH FUNCTION

CROSS-REFERENCE TO RELATED APPLICATIONS

This application is a national stage application of PCT International Application No. PCT/RU2018/050130, filed on Oct. 23, 2018, which claims priority to Russian Application Serial No. 2017143805, filed on Dec. 14, 2017, the disclosures of which are hereby expressly incorporated by reference herein in their entireties.

FIELD OF THE INVENTION

The present invention relates to computing techniques and, more particularly, to apparatuses and methods for computing a hash function.

BACKGROUND OF THE INVENTION

Current digital devices use various key hash functions to ensure authenticity of information. One of the hash functions is the GHASH function described in standard ISO/IEC 19772: 2009 A.8.

This function is defined as:

$$\text{GHASH}(S,H)=X_l,$$

where S is data of a frame data,
H is the hash function polynomial which is a key of the hash function,
l is the quantity of data units in S, $$X_i = \begin{cases} 0, & \text{if } i = 0 \\ (X_{i-1} \oplus S_i) \cdot H, & \text{if } i \le l \end{cases}$$

Acceleration of computation of the function reduces the processing time of each data frame and, as a result, reduces the data latency in a data processing device and improves its performance.

For example, U.S. Pat. No. 7,970,130 (priority of 21.09.2007) discloses a method and apparatus for computing a hash function for Galois Counter Mode (GCM), the method comprising: for input data including associated data A, a ciphertext C, a polynomial H, first computing an interim value $$X_A = A_1 H^{m+1} \oplus A_2 H^m \oplus \ldots \oplus (A_m * |S^{k-v}) \cdot H,$$

then an interim value $$X_C = C_1 H^{n+1} \oplus C_2 H^n \oplus \ldots \oplus (C_n * \| S^{k-u}) H^2 \oplus (\text{len}(A) \| \text{len}(C)) H,$$

and values $H^{n+1}$, and thereafter computing a value $$X_A H^{n+1} \oplus X_C$$

which is a desired GHASH function value.

An apparatus which performs the computations is comprised of a first, second, and third computational modules for computing the values $X_A$, $X_C$, and $H^{n+1}$ respectively and a fourth computational module for computing the value $X_A H^{n+1} \oplus X_C$. Said apparatus enables to compute the GHASH(A,C,H) value in max (m,n)+1 cycles, where m is the quantity of data blocks in A, and n is the quantity of data blocks in C, l=m+n+1 being the quantity of blocks provided to an input of the GHASH function.

Those method and apparatus are regarded as the closest prior art.

The disadvantages of said known apparatus and method are low speed and inability to choose a configuration of the apparatus before manufacturing. For example, the best speed in the known apparatus and method can be achieved if m=n. In this case, a twofold acceleration can be attained compared to sequential computation.

SUMMARY OF THE INVENTION

The technical effect of the invention includes:
1) increasing the speed of computations,
2) extending the capability of selecting the apparatus configuration.

To this end, an apparatus is provided for computing a hash function for a digital data frame, said data frame consisting of data blocks of k bits in length, the apparatus comprising:
a preliminary preparation unit having M inputs with a size of k bits, where M>1;
M pipelined computation units whose inputs are respective outputs of the preliminary preparation unit and which use pipeline multipliers containing L stages;
a combining unit having M inputs, each input being connected to a respective output of the pipelined computation unit, and an output of the combining unit being an output of the apparatus as a whole;
wherein the preliminary preparation unit further comprises M FIFO buffer registers and is configured to:
write data blocks arriving simultaneously at the M inputs to ends of respective FIFO buffer registers;
determine a quantity of the data blocks written to the FIFO buffer registers of the preliminary preparation unit;
determine presence, in the FIFO buffer registers of the preliminary preparation unit, a last data block of the data frame;
read, from respective FIFO buffer registers, data blocks to all the M outputs of the preliminary preparation unit if L×M data blocks are present in the FIFO buffer registers of the preliminary preparation unit or if the last block of the data frame is present in the FIFO buffer registers of the preliminary preparation unit;
mark outputs of the unit as having no data if the L×M data blocks are lacking in the FIFO buffer registers of the preliminary preparation unit and the last data frame of the data block is lacking in the FIFO buffer registers of the preliminary preparation unit;
enumerate the data blocks that are being read from the FIFO buffer registers of the preliminary preparation unit, wherein
if the last data block is present in the FIFO buffer registers of the preliminary preparation unit, the data blocks are enumerated from the end of the data frame and starting with zero,
if the last data block is lacking in the FIFO buffer registers of the preliminary preparation unit, a number L×M is assigned to each read block;
each of the M pipelined computation units running in parallel comprises:
a memory module,
a feedback disable module,
an adder,
a pipeline multiplier having L stages,
a feedback unit,
an accumulation unit;
wherein the memory module is configured to:
store data written thereto;

provide, to an output of the memory module, data stored
   in memory locations of the memory module whose
   number is equal to numbers of data blocks arriving at
   an input of the memory module;
the adder comprises a first and second inputs and one
   output and is configured to sum, in a field GF ($2^k$), data
   blocks arriving at a first and second inputs, and transfer
   a result to an output of the adder;
the feedback disable module comprises a first and second
   inputs, a counter, and an output, and is configured to:
increment a value of the counter when a data block is
   received at the second input;
transfer a data block from the first input to the output if the
   counter value is greater than or equal to M;
transfer a data block containing zeros in all bits to the
   output if the counter value is less than M;
reset the counter value to zero if a number of the data
   block received at the second input is less than M;
the pipeline multiplier comprises:
a first and second inputs,
L multiplication pipeline stages connected one after
   another, the stages operating simultaneously and each
   performing own part of computations of multiplication
   of two blocks, wherein inputs of a first multiplication
   pipeline stage are connected to the inputs of the pipe-
   line multiplier,
one output which is an output of a last multiplication
   pipeline stage;
wherein the pipeline multiplier is configured to enumerate
   output blocks in such a way that an output data block
   is assigned with a number of a respective data block
   taken from the first input;
the feedback units comprises:
a first and second inputs and one output,
a FIFO buffer register whereto data blocks received at the
   first input of the feedback unit are written;
the feedback unit is configured to read data blocks from
   a FIFO buffer register to the output only when data
   blocks arrive at the second input;
the accumulation unit comprises an accumulation
   memory location and is configured to:
receive, at an input, data blocks and their numbers;
compare a number of an incoming data block with L×M;
if the number of the incoming data block is greater than
   or equal to L×M, reset the accumulation memory
   location to zero;
if the number of the incoming data block is less than L×M,
   sum the incoming data block in the field GF ($2^k$) with
   a value contained in the accumulation memory loca-
   tion, and write a result back to the accumulation
   memory location;
wherein an input of each pipelined computation unit is
   connected to the first input of the adder, the input of the
   memory module, the second input of the feedback
   disable module, and the second input of the feedback
   unit;
wherein the first input of the pipeline multiplier is con-
   nected to the output of the memory module, and the
   second input of the pipeline multiplier is connected to
   the output of the adder;
wherein the output of the pipeline multiplier is connected
   to the input of the accumulation unit and to the first
   input of the feedback unit, and the output of the
   feedback unit is connected to the first input of the
   feedback disable module; the output of the feedback
   disable module is connected to the second input of the
   adder; the output of the accumulation unit is the output
   of the pipelined computation unit; the combining unit
   comprises M inputs and is configured to sum data
   blocks in the field GF ($2^k$) from all the M inputs and
   output a result of said summation.
Furthermore, a method is provided for operating this
   apparatus, comprising:
determining a polynomial H of a hash function;
resetting contents of all the FIFO buffer registers of the
   preliminary preparation unit to zero;
resetting a memory location of accumulation units of all
   the pipelined computation units;
computing values of powers of the polynomial H com-
   puted in a field GF ($2^k$);
writing the computed values of the powers of the poly-
   nomial H to the memory modules of all the pipelined
   computation units, where $H^{i+1}$ is written to a memory
   location with a number i, $0 \leq i \leq L \times M$, and $H^{LM}$ is written
   to a memory location with a number L×M;
writing L data blocks containing zeros in all bits to the
   feedback units of all the pipelined computation units;
resetting counter values in the feedback disable modules
   of all the pipelined computation units to zero;
providing sequent M data blocks of the data frame simul-
   taneously to the M inputs of the preliminary prepara-
   tion unit;
if there are incoming data blocks, writing sequent data
   blocks to respective M FIFO buffer registers in the
   preliminary preparation unit;
if any of the FIFO buffer register contains a last data block
   of the data frame, then
   reading sequent data blocks from each FIFO buffer
      register;
   transferring them to the output of the preliminary
      preparation unit;
   assigning, to each data block, a serial number starting
      from zero and counting from the last data block of
      the frame located in the FIFO buffer registers;
otherwise, if queues have length L and do not contain the
   last data block of the data frame, then
   reading sequent data blocks from each FIFO buffer
      register;
   transferring them to the output of the preliminary
      preparation unit;
   assigning, to each data block, a number L×M;
transferring data blocks from the outputs of the prelimi-
   nary preparation unit to inputs of respective pipelined
   computation units;
transferring incoming data blocks to the input of the
   memory module, the first input of the adder, the second
   input of the feedback disable module, the second input
   of the feedback unit in each pipelined computation unit;
using a number of an incoming data block as a memory
   module address in the memory module, extracting a
   value of a power of H pre-recorded in the memory
   module to the field GF ($2^k$);
providing the extracted value to the output of the memory
   module;
executing, in the adder, the steps of:
   summing, in the field GF ($2^k$), data blocks incoming
      from the first and second inputs;
   assigning, to a result of the summation, a number of a
      data block from the first input;
   transferring said result to the output of the adder;
transferring the data block from the output of the memory
   module to the first input of the pipeline multiplier;
transferring a sequent data block from the output of the
   adder to the second input of the pipeline multiplier;

computing a product of data blocks in the field GF ($2^k$) in the pipeline multiplier, transferring it to the output of the pipeline multiplier, and assigning, to a resulting block, a number equal to a number of a respective incoming data block taken from the second input of the pipeline multiplier;

transferring the data block from the output of the pipeline multiplier to the input of the accumulation unit and the first input of the feedback unit;

if there is an incoming data block at the first input of the feedback unit, writing it to the FIFO buffer registers of the feedback unit;

if there is an incoming data block at the second input of the feedback unit, then reading a sequent data block from a FIFO buffer register of the feedback unit;

transferring it to the output of the feedback unit;

transferring the data block from the output of the feedback unit to the first input of the feedback disable module;

executing, in the feedback disable module, the steps of:

if a data block arrives at the second input, increasing a value of the counter;

if the counter value is greater than or equal to M, transferring a data block from the first input to the output;

if the counter value is less than M, transferring a data block containing zeros in all bits to the output;

if a number of the data block that has arrived at the second input is less than M, resetting the counter value to zero;

transferring the data blocks from the output of the feedback disable module to the second input of the adder;

checking presence of data at the input of the accumulation unit, if there is a data block at the input, then if its number is less than L×M, but greater or equal to M, then summing, in the field GF ($2^k$), an incoming data block and contents of a memory location of the accumulation unit;

writing a result back to the accumulation memory location;

otherwise, if the number of the incoming data block is less than M, then summing, in the field GF ($2^k$), the incoming data block and the contents of the memory location of the accumulation unit;

writing the result to the output of the accumulation unit;

resetting the contents of the accumulation unit memory location to zero;

if there is no data block at the input of the accumulation unit or if there is a data block there, but its number is equal to L×M, then data is not transferred to the output of the accumulation unit;

transferring the data block from the output of the accumulation unit to the output of the pipelined computation unit;

transferring the data blocks from the output of pipelined computation units to the inputs of the combining unit;

checking presence of incoming data blocks in the combining unit, if there is no data blocks at the input, then marking the output of the combining unit as having no data;

otherwise, if there are data blocks at the input, then summing, in the field GF ($2^k$), data blocks from all the inputs;

transferring a result of the summation, which is a value of the hash function, to the output of the combining unit.

It should be noted that the expression for GHASH(S,H) =$X_1$ can be rewritten as $$X_1 = ((\ldots (S_0 \cdot H \oplus S_1) \cdot H \oplus \ldots) \cdot H \oplus S_l) \cdot H$$

Taking into account linearity of the operations performed, one may expand brackets and gather M groups of terms by grouping over j all terms including $S_{iM+j}$, where $0 \leq j \leq M$. Furthermore, M can be any positive natural number. Applying the Horner's rule to each of the groups separately results in $$X_l = (((\ldots)H^M \oplus S_{l-2M})H^M \oplus S_{l-M})H^M \oplus S_l)H^1$$
$$\oplus (((\ldots)H^M \oplus S_{l-2M-1})H^M \oplus S_{l-M-1})H^M \oplus S_{l-1})H^2$$
$$\vdots$$
$$\oplus (((\ldots)H^M \oplus S_{l-2M-(M-1)})H^M \oplus S_{l-M-(M-1)})H^M \oplus S_{l-(M-1)})H^M$$

If incoming data is properly grouped, M summands (partial sums) of this expression can be computed independently of each other; in this case, it is necessary to multiply by $H^M$ rather than by H, and the last time in each expression it is necessary to multiply by values of different powers of H depending on the number of the data block which has been added before the multiplication—after adding the last data block it is necessary to multiply by $H^1$, after adding the last but one data block it is necessary to multiply by $H^2$, and so on.

Different summands of this expression can be computed in different computing units operating in parallel, thereby increasing the speed by M times owing to the increased number of apparatuses by M times.

It should be also noted that different summands of this expression can be computed not only at different computation units, but also at a single pipelined computation unit in which different partial sums are processed simultaneously in the same computation unit, but reside at each time instant in different pipeline stages.

The use of M pipelined processing units operating in parallel can increase the speed of the inventive apparatus by M times.

Another method for increasing the speed of the present apparatus is to increase the clock frequency of the apparatus by L times through the use of a pipeline multiplier comprising L multiplication stages.

Since addition in the Galois field is the simplest bitwise XOR, requires few resources, and is completed quickly, then the multiplier is the main limitation to increasing the clock frequency. Therefore, if computation of the product is split into several pipeline stages, thereby reducing the length of critical signal paths, then the operational frequency of the apparatus can be significantly increased.

The splitting of the multiplication procedure into several parts is of little complexity—with the grade-school multiplication, summation of results of bitwise multiplication can be split into several parts, and with the recursive Karatsuba multiplication algorithm, a subsequent pipeline stage can be completed, for example, after performing additions of the algorithm for smaller algorithm blocks and before starting addition of larger ones. Other partitions and algorithms can be applied.

If the splitting is successful, critical paths of electric signals in the circuit will be divided into L approximately equal parts, and it is possible to achieve the increase in the clock frequency by L times. After the splitting, each loaded data block will require L clock cycles to pass through the entire circuit, however, this fact is leveled by the ability to load L data blocks simultaneously into the apparatus.

A combination of the described steps increases the speed of the apparatus by L×M times compared with the sequential computation. Thus, the inventive apparatus computes a value of the desired function in $$\left\lceil \frac{l}{M} \right\rceil$$

clock cycles (rounding up to a nearest integer value), each of the clock cycles being L times shorter.

The present apparatus enables to choose an appropriate configuration; therefore, when designing an apparatus for specific application conditions, the most beneficial values of M and L can be chosen for the given specific conditions. For example, the number of L stages of the pipeline multiplier can be increased in order to achieve a given speed, thereby increasing the maximum possible operational frequency of the apparatus until other process factors limit further increase of the frequency. Then the number of pipelined computation units M can be increased until the required performance is attained.

A particular embodiment of the apparatus comprises supplying, to the input, data blocks additionally containing a flag K, wherein, for data blocks belonging to the first data frame being processed, the flag K is zero, and, for data blocks of all subsequent data frames, the flag K is set according to the following rule:
  if the hash function for a next data frame is to be computed on the same value of the polynomial H as the hash function for a previous data frame, then a value of the flag K for all data blocks of the next data frame is set to the same value as a value of the flag K of data blocks of the previous data frame;
  otherwise, the value of the flag K for all the data blocks of the next data frame is set to a value opposite to the value of the flag K for the data blocks of the previous data frame;
wherein the apparatus
  comprises an additional independent memory module in each pipelined computation unit that is connected in parallel with the existing memory module;
  in each pipelined computation unit, data blocks are supplied to the memory module if the flag K is zero, or to the additional memory module if the flag K is one.

The presence of the additional memory module in the particular embodiment of the apparatus enables to process different data frames by using different values of the polynomial H of the hash function without stopping operation of the apparatus to load a new polynomial H of the hash function into memory modules of the pipelined computation unit, due to the fact that while the memory module of the pipelined computation unit is used to process data blocks of the data frame, values of the new polynomial H of the hash function can be loaded into the additional memory module of the pipelined computation unit, and vice versa.

This enables to increase the speed of the apparatus when it is required from the apparatus to process data frames using different polynomials H of the hash function.

A developer who designs the present apparatus can make a decision regarding expediency of including an additional memory module based on information about the increased cost of the apparatus due to presence of the additional memory module, as well as based on analysis of a required rate of changing the polynomial H of the hash function and analysis of how the idle period of the apparatus during changing the polynomial H of the hash function impairs performance of the apparatus.

Where additional memory modules are present in each pipelined computation unit, a particular embodiment of the method is implemented, wherein the step of transferring incoming data blocks to the input of the memory module comprises the following steps:
  if an incoming data block is marked with the flag K equal to zero, then
    transferring the incoming data block to the input of the memory module,
    computing values of powers of a next polynomial H in the field GF ($2^k$) for a next data frame,
    writing the computed values of the powers of the polynomial H for the next data frame to an additional memory module of the pipelined computation unit, where $H^{i+1}$ is written to a memory location with a number i, $0 \leq i \leq L \times M$, and $H^{LM}$ is written to a memory location with a number L×M;
  if the incoming data block is marked with the flag K equal to one, then
    transferring the incoming data block to the input of the additional memory module,
    computing the values of the powers of the next polynomial H in the field GF ($2^k$) for the next data frame,
    writing the computed values of the powers of the polynomial H for the next data frame into a memory location of the pipelined computation unit, where $H^{i+1}$ is written to a memory location with a number i, $0 \leq i \leq L \times M$, and $H^{LM}$ is written to a memory location with a number L×M.

The described particular embodiment of the method can increase the speed of the apparatus where it is required from the apparatus to process data frames by using different polynomials H of the hash function. Data blocks of data frames are received at the input of the apparatus and include the flag K preset in accordance with taking into account what polynomial H of the hash function the frame should be processed for. When data frames are processed with one polynomial H of the hash function, one of the memory modules is used, while values of powers of the polynomial H for the next data frame are loaded into the other memory module. This enables not to stop the apparatus to change the polynomial H of the hash function.

In another particular embodiment of the apparatus, the output of the pipeline multiplier unit is connected directly to the first input of the feedback disable module, bypassing the feedback unit.

This particular embodiment can be advantageously used when it is known in advance that data blocks of data frames arrive at the present apparatus at each clock cycle of the clock frequency without spacings. In this case, it is also possible to turn off power from the unused feedback unit, thereby reducing power consumption of the apparatus.

If it is already known at the phase of designing the apparatus that data blocks of data frames will always arrive at the apparatus at each clock cycle without spacings, the feedback unit may be omitted, which saves hardware resources and reduces the cost of the apparatus.

A particular embodiment of the method is provided for implementation of this particular embodiment of the apparatus, comprising: transferring a data block from the output of the pipeline multiplier to the input of the accumulation unit and the first input of the feedback disable module instead of the first input of the feedback unit.

The transfer of the data block from the output of the pipeline multiplier to the input of the accumulation unit and the first input of the feedback disable module instead of the first input of the feedback unit reduces the number of operations performed, which can also reduce power consumption and enhance performance of the apparatus.

DESCRIPTION OF THE INVENTION

Figure 1:
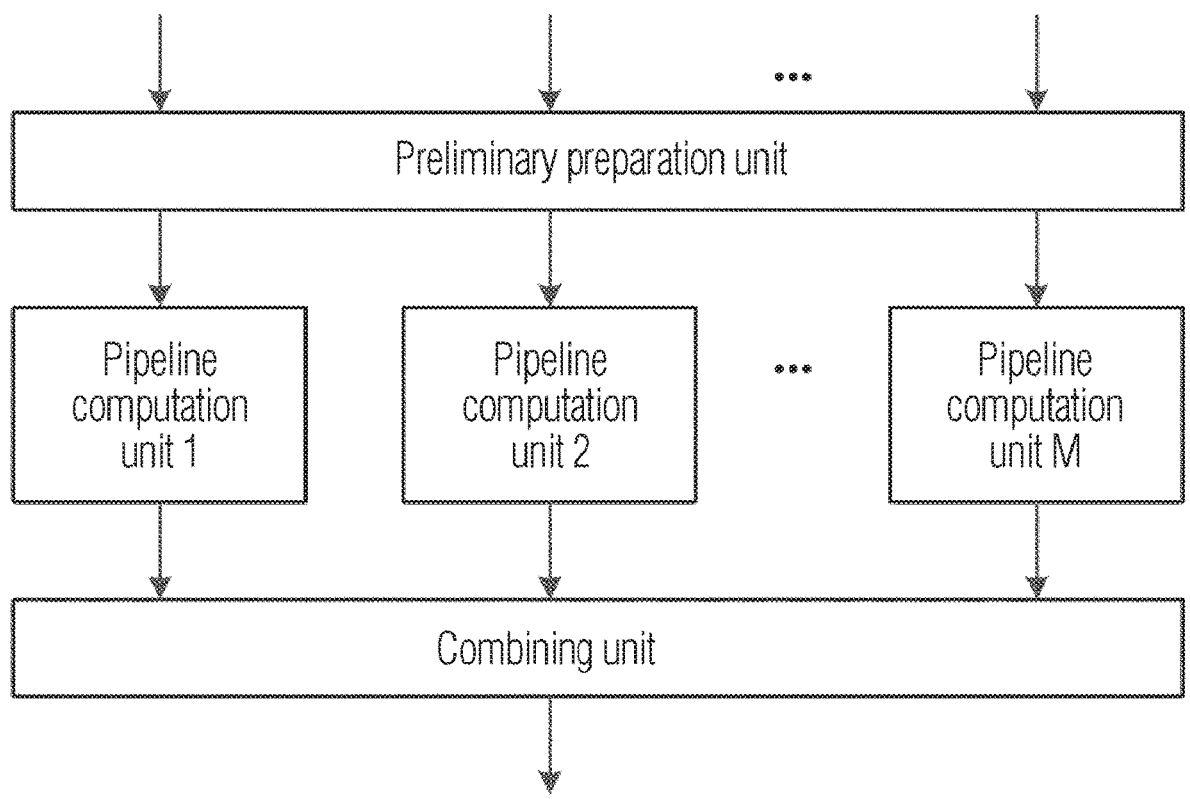
FIG. 1 shows a structural diagram of the apparatus.
Figure 2:
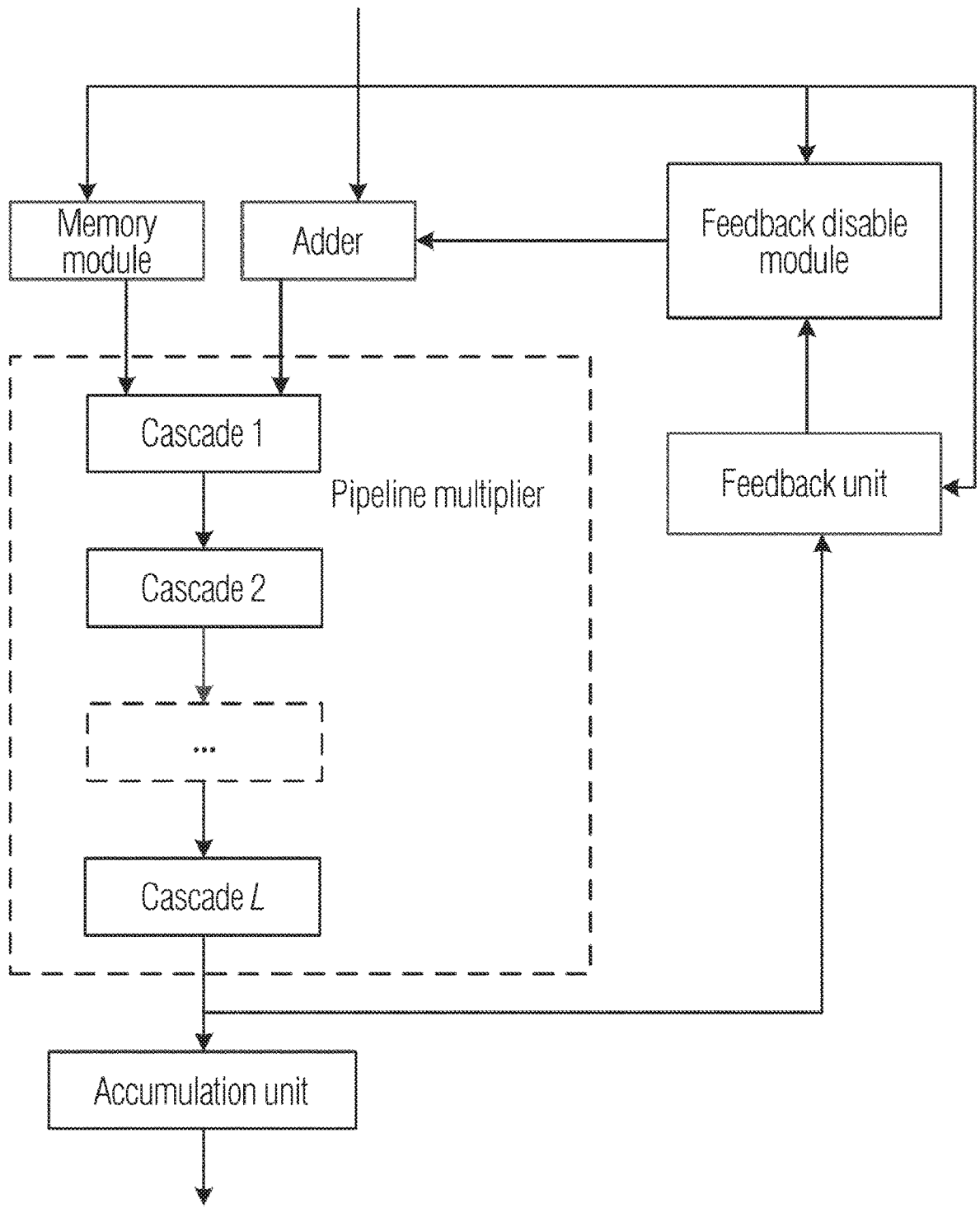
FIG. 2 shows a structural diagram of the pipelined computation unit.

It is required, in order to produce the inventive apparatus, to define initial data: the number k of bits in each data block, the number L of stages in pipeline multipliers, the number M of pipelined computation units.

The number k of bits in each data block is chosen based on a data block size in an algorithm used for authentication.

The number L of stages in the pipeline multipliers is chosen to be sufficient for the operation frequency of the pipeline multiplier to reach the maximum clock frequency $F_{max}$ for other circuit components.

The number M of pipelined computation units is chosen to be sufficient to attain the required speed based on the following formula $$P = F_{max} kM, \text{ bits/s}$$

If M−1 pipelined computation units are not enough to achieve the required speed, and M pipelined computation units provide a speed that exceeds the required one, then, in order to reduce power consumption, the operational frequency of the apparatus is chosen according to the formula $$F = P/(k \cdot M)$$

Then, the apparatus according to the description is designed as comprising all the components with account of connections between them and according to their intended function.

The apparatus is preferably made as an integral unit of a computing system that performs the function of ensuring authenticity of data, prepares the data for processing by the present apparatus, and uses values of the GHASH hash function computed by the apparatus to confirm authenticity of the data.

For example, the present apparatus can be made in the form of a special purpose integrated circuit unit that performs the functions of ensuring authenticity of data and comprises an interface for receiving and sending data; a unit for preparing data for operation of the present apparatus, the present apparatus for computing the hash function, and the unit that uses the computed hash function to ensure authenticity of the data. The present apparatus may also be included by other computing systems in which it is required to compute said hash function.

The present apparatus can be implemented in the form of an integrated circuit unit or a unit of an apparatus for ensuring authenticity of data that is made on the basis of a field-programmable gate array (FPGA) or a master chip by a person skilled in designing digital integrated circuits.

The apparatus according to the description is made to implement the present method. Then, a bit representation is determined for a value of the polynomial H which is a key of the hash function and whose value must be maintained in secret. For example, 128 bits of bit representation of the value of the polynomial H can be obtained from a random number generator. Depending on the algorithm used, the H value can be determined in other ways.

Then, contents of all the FIFO buffer registers of the preliminary preparation unit are reset to zero, values of powers of the polynomial H up to $H^{LM}$ are computed in the field GF $(2^k)$, their bit representations are written to the memory modules of all the pipelined computation units, where $H^{i+1}$ is written to a memory location with a number i, $0 \le i \le L \times M$, and $H^{LM}$ is written to a memory location with a number L×M, L data blocks comprising zeros in all bits are written to the feedback units of all the pipelined computation units, counter values in the feedback disable modules of all the pipelined computation units are reset to zero.

Thereafter processing of data frames begins. To this end, the data frames are divided into blocks of k bits, the last block being provided with metadata indicating that this is the last block of a data frame. M sequent data blocks are supplied simultaneously to the M inputs of the preliminary preparation unit. The preliminary preparation unit enumerates the data blocks (provides them with metadata). Then, the data blocks are transferred from the outputs of the preliminary preparation unit to the inputs of respective M pipelined computation units. Each pipelined computation unit, by using the H power values stored in the memory modules, computes L partial sums and sums them in the accumulation unit of the pipelined computation unit.

Then, the data blocks from the outputs of the pipelined computation units are transferred to the M inputs of the combining unit, the data blocks received at the inputs of the combining unit are summed, and the result, which is the desired value, is transferred to the output of the apparatus.

Implementation of the particular embodiment of the apparatus where an additional independent memory module is present in each pipelined computation unit, said additional module being connected in parallel to the existing memory module, enables to accelerate data processing owing to elimination of idle periods of the apparatus when loading values of the powers of the polynomial H during changing the hash function key.

The presence of the two memory modules in each pipelined computation unit enables to load values of powers of H for a new key in one of the memory modules without stopping operation of the apparatus while data is being processed using powers of H for the old key stored in the other memory module. In this case data blocks additionally containing a flag K are applied to the inputs of the apparatus, wherein the flag K has a value equal to zero for data blocks belonging to the first data frame being processed, and for data blocks of all subsequent data frames the flag K is set according to the following rule:

if the hash function for a next data frame should be computed on the same value of the polynomial H as the hash function for a preceding data frame, then a value of the flag K for all data blocks of the next data frame is set to the same value as a value of the flag K for data blocks of the preceding data frame;

otherwise, the value of the flag K for all the data blocks of the next data frame is set to a value opposite to the value of the flag K for the data blocks of the previous data frame;

wherein, in the apparatus in each pipelined computation unit, data blocks are supplied to the memory module if the flag K is equal to zero or to the additional memory module if the flag K is equal to one.

To implement the particular embodiment of the apparatus, data blocks of the current data frame are additionally provided with the flag K, and the flag K value is preset in accordance with the rule described above. Furthermore, in each pipelined computation unit, the step of transferring incoming data blocks to the input of the memory module comprises:

if an incoming data block is marked with the flag K equal to zero, then
transferring the incoming data block to the input of the memory module,
computing values of powers of the next polynomial H in the field GF ($2^k$) for the next data frame,
writing the computed values of the power of the polynomial H for the next data frame to the additional memory module of the pipelined computation unit, where $H^{i+1}$ is written to the memory location with a number i, 0≤i≤L×M, and $H^{LM}$ is written to the memory location with a number L×M;

if the incoming data block is marked with the flag K equal to one, then
transferring the incoming data block to the input of the additional memory module,
computing the values of the powers of the next polynomial H in the field GF ($2^k$) for the next data frame,
writing the computed values of the powers of the polynomial H for the next data frame to the memory module of the pipelined computation unit, where $H^{i+1}$ is written to the memory location with a number i, 0≤i≤L×M, and $H^{LM}$ is written to the memory location with a number L×M.

Another particular embodiment of the apparatus is possible, wherein the output of the pipeline multiplier in the apparatus can be connected directly to the first input of the feedback disable module, bypassing the feedback unit. In this case, the apparatus can operate correctly only if data blocks of a data frame are fed to the apparatus input for each clock cycle without spacings until the end of each frame.

This particular embodiment can be implemented, for example, by using electronic switches that disconnect the output of the pipeline multiplier from the feedback unit and connect it to the first input of the feedback disable module. In this case the feedback unit can be powered off to save power when the output of the pipeline multiplier is connected directly to the first input of the feedback disable module.

If it is known in advance that data blocks of the data frame are fed to the apparatus input for each clock cycle without spacings until the end of each frame, then this particular embodiment of the apparatus can be implemented without the feedback unit at all. In this case the output of the pipeline multiplier is connected directly to the first input of the feedback disable module. This design can save electric power and hardware resources, for example, space on an integrated circuit chip on which the apparatus is implemented.

In this case the method comprises supplying, to the input of the apparatus, M data blocks per each clock cycle until the end of the current data frame. Additionally, in each pipelined computation unit a data block is transferred from the output of the pipeline multiplier to the input of the accumulation unit and to the first input of the feedback disable module instead of the first input of the feedback unit.

The invention claimed is:
1. An apparatus for computing a hash function for a digital data frame, said data frame consisting of data blocks of k bits in length, where k is an integer value, comprising:
a preliminary preparation unit having M inputs with a size of k bits, wherein M>1;
M pipelined computation units whose inputs are respective outputs of the preliminary preparation unit and which use pipeline multipliers including L stages; and
a combining unit having M inputs, each input being connected to a respective output of the pipelined computation unit, and an output of the combining unit being an output of the apparatus as a whole;
wherein the preliminary preparation unit further comprises M FIFO buffer registers and is configured to:
write data blocks arriving simultaneously at the M inputs to ends of respective FIFO buffer registers;
determine a quantity of data blocks written to the FIFO buffer registers of the preliminary preparation unit;
determine presence, in the FIFO buffer registers of the preliminary preparation unit, of a last data block of the data frame;
read, from respective FIFO buffer registers, data blocks to all the M outputs of the preliminary preparation unit if L×M data blocks are present in the FIFO buffer registers of the preliminary preparation unit or if the last block of the data frame is present in the FIFO buffer registers of the preliminary preparation unit;
mark the outputs of the unit as having no data in the case of absence, in the FIFO buffer registers of the preliminary preparation unit, of L×M data blocks and absence, in the FIFO buffer registers of the preliminary preparation unit, of the last data frame of the data block; and
enumerate data blocks that are read from the FIFO buffer registers of the preliminary preparation unit, wherein:
if the last data block is present in the FIFO buffer registers of the preliminary preparation unit, the data blocks are enumerated from the end of the data frame and starting with zero, and
if the last data block is absent in the FIFO buffer registers of the preliminary preparation unit, a number L×M is assigned to each read block;
wherein each of the M pipelined computation units operating in parallel comprises:
a memory module,
a feedback disable module,
an adder,
a pipeline multiplier having L stages,
a feedback unit, and
an accumulation unit;
wherein the memory module is configured to: store data written thereto; and supply, to an output of the memory module, data stored in memory locations of the memory module which have a number that is equal to numbers of data blocks arriving at an input of the memory module;
wherein the adder comprises a first and second inputs and one output and is configured to sum, in a Galois field of power $2^k$ ("GF ($2^k$)"), data blocks arriving at the first and second inputs, and transfer a result to the output of the adder, where k is the integer value;

wherein the feedback disable module comprises a first and second inputs, a counter, and an output, and is configured to: increment a value of the counter when a data block is received at the second input; transfer a data block from the first input to the output if the counter value is greater than or equal to M; transfer a data block containing zeros in all bits to the output if the counter value is less than M; and reset the counter value to zero if a number of the data block received at the second input is less than M;

wherein the pipeline multiplier comprises: a first and second inputs, L multiplication pipeline stages connected one after the other and operating simultaneously, each performing its own part of computations of a product of two blocks, wherein inputs of a first stage of the multiplication pipeline are connected to the inputs of the pipeline multiplier, and one output which is an output of a last stage of the multiplication pipeline;

wherein the pipeline multiplier is configured to enumerate output blocks in such a way that an output data block is assigned with a number of respective data block taken from the first input;

wherein the feedback units comprises: a first and second inputs and one output, and a FIFO buffer register whereto data blocks received at the first input of the feedback unit are written; wherein the feedback unit is configured to read data blocks from the FIFO buffer register to the output only when data blocks arrive at the second input;

wherein the accumulation unit comprises an accumulation memory location and is configured to: receive, at the input, data blocks and their numbers; compare a number of an incoming data block with L×M; if the number of the incoming data block is greater than or equal to L×M, reset the accumulation memory location to zero; if the number of the incoming data block is less than L×M, sum the incoming data block in the field GF ($2^k$) with a value contained in the accumulation memory location and write a result back into the accumulation memory location;

wherein an input of each pipelined computation unit is connected to the first input of the adder, the input of the memory module, the second input of the feedback disable module, and the second input of the feedback unit;

wherein the first input of the pipeline multiplier is connected to the output of the memory module, and the second input of the pipeline multiplier is connected to the output of the adder;

wherein the output of the pipeline multiplier is connected to the input of the accumulation unit and the first input of the feedback unit, and the output of the feedback unit is connected to the first input of the feedback disable module;

wherein the output of the feedback disable module is connected to the second input of the adder;

wherein the output of the accumulation unit is the output of the pipelined computation unit; and wherein the combining unit comprises M inputs and is configured to sum data blocks in the field GF ($2^k$) from all the M inputs and provide a result of said summation to the output.

2. The apparatus according to claim 1, wherein data blocks additionally containing a flag K are provided to the input of the apparatus, wherein, for data blocks belonging to a first data frame being processed, the flag K has a zero value and, for data blocks of all subsequent data frames, the flag K is set according to the following rule:

if the hash function for a next data frame should be computed on the same value of the polynomial H as the hash function for a preceding data frame, then a value of the flag K for all data blocks of the next data frame is set to the same value as a value of the flag K for data blocks of the previous data frame;

otherwise, the value of the flag K for all the data blocks of the next data frame is set to a value opposite to the value of the flag K for the data blocks of the previous data frame;

wherein: the apparatus comprises an additional independent memory module in each pipelined computation unit, said additional module being connected in parallel with the existing memory module; and wherein in the apparatus, in each pipelined computation unit, data blocks arrive in the memory module if the flag K is zero or in the additional memory module if the flag K is one.

3. The apparatus according to claim 2, wherein the output of the pipeline multiplier unit is configured to be connected directly to the first input of the feedback disable module, bypassing the feedback unit.

4. The apparatus according to claim 1, wherein the output of the pipeline multiplier unit is configured to be connected directly to the first input of the feedback disable module, bypassing the feedback unit.

5. A method of computing a hash function for a digital data frame, said data frame is comprised of a data block of k bits in length, where k is an integer value, the method comprising:

determining a polynomial H of the hash function;

resetting contents of all FIFO buffer registers of a preliminary preparation unit to zero;

resetting a memory location of accumulation units of all pipelined computation units to zero;

computing values of powers of the polynomial H computed in a Galois field of power $2^k$ ("GF ($2^k$)"), where k is the integer value;

writing the computed values of the powers of the polynomial H to memory modules of all the pipelined computation units, where $H^{i+1}$ is written to a memory location with a number i, $0 \le i \le L \times M$, and $H^{LM}$ is written to a memory location with a number L×M;

writing L data blocks comprising zeros in all bits to feedback units of all pipelined computation units;

resetting a value of a counter in feedback disable modules of all the pipelined computation units to zero;

supplying, simultaneously to M inputs of the preliminary preparation unit, sequent M data blocks of the data frame;

if there are incoming data blocks, writing the sequent data blocks to respective M FIFO buffer registers in the preliminary preparation unit;

if a FIFO buffer register contains a last data block of the data frame, then: reading sequent data blocks from each FIFO buffer register; transferring them to the output of the preliminary preparation unit; and assigning, to each data block, a serial number starting from zero and counting from the last data block of the frame located in the FIFO buffer registers;

otherwise, if queues have length L and do not contain the last data block of the data frame, then: reading sequent data blocks from each FIFO buffer register; transferring them to the output of the preliminary preparation unit; and assigning a number L×M to each data block;

transferring data blocks from the outputs of the preliminary preparation unit to inputs of respective pipelined computation units;

transferring incoming data blocks to an input of the memory module, a first input of an adder, a second input of the feedback disable module, a second input of the feedback unit in each pipelined computation unit;

using a number of an incoming data block as a memory module address in the memory module, extracting a value of a power of H pre-stored in the memory module to the field GF ($2^1$);

supplying the extracted value to the output of the memory module;

executing in the adder the steps of: summing, in the field GF ($2^1$), data blocks incoming from the first and second inputs; assigning, to a result of the summation, a number of a data block from the first input; and transferring said result to the output of the adder;

transferring the data block from the output of the memory module to the first input of the pipeline multiplier;

transferring a sequent block from the output of the adder to the second input of the pipeline multiplier;

computing a product of data blocks in the field GF ($2^k$) in the pipeline multiplier, transferring it to the output of the pipeline multiplier, and assigning, to a resulting block, a number equal to a number of a respective incoming data block taken from the second input of the pipeline multiplier;

transferring the data block from the output of the pipeline multiplier to the input of the accumulation unit and the first input of the feedback unit;

if there is an incoming data block at the first input of the feedback unit, writing it to the FIFO buffer registers of the feedback unit;

if there is an incoming data block at the second input feedback unit, then: reading a sequent data block from a FIFO buffer register of the feedback unit; and transferring it to the output of the feedback unit;

transferring the data block from the output of the feedback unit to the first input of the feedback disable module;

executing in the feedback disable module the steps of: if a data block arrives at the second input, incrementing a value of a counter; if the counter value is greater than or equal to M, transferring a data block from the first input to the output; if the counter value is less than M, transferring a data block containing zeros in all bits to the output; and if a number of the data block received at the second input is less than M, resetting the counter value to zero;

transferring data blocks from the output of the feedback disable module to the second input of the adder;

checking whether there is data at the input of the accumulation unit, wherein if there is a data block at the input, then:

if its number is less than L×M, but greater or equal to M, then summing, in the field GF ($2^k$), an incoming data block and contents of a memory location of the accumulation unit; and writing a result back to the accumulation memory location;

otherwise, if the number of the incoming data block is less than M, then: summing, in the field GF ($2^k$), the incoming data block and the contents of the memory location of the accumulation unit; writing the result to the output of the accumulation unit; and resetting the contents of the memory location of the accumulation unit to zero;

if there is no data block at the input of the accumulation unit or if there is a data block there, but its number is equal to L×M, then data is not transferred to the output of the accumulation unit;

transferring the data block from the output of the accumulation unit to the output of the pipelined computation unit;

transferring data blocks from the output of pipelined computation units to the inputs of the combining unit;

checking whether there are incoming data blocks in the combining unit, wherein if there are no data blocks at the input, then marking the output of the combining unit as having no data; wherein otherwise, if there are data blocks at the input, then summing, in the field GF ($2^k$), data blocks from all the inputs; and transferring a result of the summation, which is a value of the hash function, to the output of the combining unit.

6. The method according to claim 5, wherein, if additional memory modules are present in each pipelined computation unit, the step of transferring incoming data blocks to the input of the memory module comprises:

if an incoming data block is marked with a flag K equal to zero, then:

transferring the incoming data block to the input of the memory module;

computing values of powers of a next polynomial H in the field GF ($2^k$) for a next data frame; and writing the computed values of the powers of the polynomial H for the next data frame to an additional memory module of the pipelined computation unit, where $H^{i+1}$ is written to a memory location with a number i, $0 \le i \le L \times M$, and $H^{LM}$ is written to a memory location with a number L×M; and if the incoming data block is marked with the flag K equal to one, then:

transferring the incoming data block to the input of the additional memory module;

computing the values of the powers of the next polynomial H in the field GF ($2^k$) for the next data frame; and writing the computed values of the powers of the polynomial H for the next data frame to the memory module of the pipelined computation unit, where $H^{i+1}$ is written to a memory location with a number i, $0 \le i \le L \times M$, and $H^{LM}$ is written to a memory location with a number L×M.

7. The method according to claim 6, wherein a data block is transferred from the output of the pipeline multiplier to the input of the accumulation unit and the first input of the feedback disable module instead of the first input of the feedback unit.

8. The method according to claim 5, wherein a data block is transferred from the output of the pipeline multiplier to the input of the accumulation unit and the first input of the feedback disable module instead of the first input of the feedback unit.

* * * * *